(12) United States Patent
Yoshinaga et al.

(10) Patent No.: US 6,703,744 B2
(45) Date of Patent: Mar. 9, 2004

(54) GENERATOR-MOTOR FOR VEHICLE

(75) Inventors: Soichi Yoshinaga, Nagoya (JP); Seiji Hayashi, Okazaki (JP)

(73) Assignee: Denso Corporation, Kariya (JP)

( * ) Notice: Subject to any disclaimer, the term of this patent is extended or adjusted under 35 U.S.C. 154(b) by 17 days.

(21) Appl. No.: 10/114,154

(22) Filed: Apr. 3, 2002

(65) Prior Publication Data

US 2002/0153796 A1 Oct. 24, 2002

(30) Foreign Application Priority Data

Apr. 20, 2001 (JP) ........................................ 2001-122909

(51) Int. Cl.$^7$ ............................ H02K 21/12; H02K 1/22
(52) U.S. Cl. .................. 310/156.45; 310/261; 310/262; 310/156.53
(58) Field of Search ...................... 310/156.45, 156.53, 310/261, 262

(56) References Cited

U.S. PATENT DOCUMENTS

| | | | | |
|---|---|---|---|---|
| 4,139,790 A | * | 2/1979 | Steen ..................... | 310/156.83 |
| 4,922,152 A | * | 5/1990 | Gleghorn et al. ...... | 310/156.84 |
| 5,038,065 A | * | 8/1991 | Matsubayashi et al. .... | 310/162 |
| 5,097,166 A | * | 3/1992 | Mikulic ................. | 310/156.83 |
| 5,170,083 A | * | 12/1992 | Burgbacher .................. | 310/51 |
| 5,268,603 A | * | 12/1993 | Even ........................... | 310/64 |
| 5,287,518 A | * | 2/1994 | Miller et al. ................. | 322/90 |
| 5,369,325 A | * | 11/1994 | Nagate et al. ......... | 310/156.54 |
| 5,519,275 A | * | 5/1996 | Scott et al. .................. | 310/112 |
| 5,655,485 A | * | 8/1997 | Kusase et al. ............. | 123/41.31 |
| 5,672,926 A | * | 9/1997 | Brandes et al. .............. | 310/181 |
| 5,679,995 A | * | 10/1997 | Nagate et al. ......... | 310/156.54 |
| 5,705,917 A | * | 1/1998 | Scott et al. .................... | 322/46 |
| 5,744,895 A | * | 4/1998 | Seguchi et al. ............. | 310/266 |
| 5,838,085 A | * | 11/1998 | Roesel et al. ............... | 310/113 |
| 5,864,191 A | * | 1/1999 | Nagate et al. ......... | 310/156.54 |
| 5,929,611 A | * | 7/1999 | Scott et al. .................... | 322/46 |
| 5,936,322 A | * | 8/1999 | Yamaguchi et al. ... | 310/156.19 |
| 5,962,944 A | * | 10/1999 | Narita et al. ........... | 310/156.53 |
| 5,969,451 A | * | 10/1999 | Lyons et al. ................ | 310/90.5 |
| 6,008,559 A | * | 12/1999 | Asano et al. ........... | 310/156.53 |
| 6,104,118 A | * | 8/2000 | Kanazawa et al. .......... | 310/263 |
| 6,118,194 A | * | 9/2000 | Kawamura ................. | 310/75 R |
| 6,133,659 A | * | 10/2000 | Rao ............................. | 310/89 |
| 6,144,132 A | * | 11/2000 | Nashiki .................. | 310/156.55 |
| 6,147,428 A | * | 11/2000 | Takezawa et al. ...... | 310/156.57 |
| 6,177,745 B1 | * | 1/2001 | Narita et al. ........... | 310/156.53 |
| 6,218,753 B1 | * | 4/2001 | Asano et al. ........... | 310/156.53 |
| 6,294,854 B1 | * | 9/2001 | Grosspietsch et al. ........ | 310/92 |
| 6,329,734 B1 | * | 12/2001 | Takahashi et al. ...... | 310/156.56 |
| 6,342,745 B1 | * | 1/2002 | Sakai et al. ............ | 310/156.56 |
| 6,353,275 B1 | * | 3/2002 | Nishiyama et al. .... | 310/156.21 |
| 6,373,155 B1 | * | 4/2002 | Shimizu et al. ........... | 310/68 B |
| 6,429,566 B1 | * | 8/2002 | Kuwahara .............. | 310/156.56 |
| 6,452,302 B1 | * | 9/2002 | Tajima et al. ................ | 310/216 |
| 2001/0028201 A1 | * | 10/2001 | Miyashita et al. ...... | 310/156.38 |
| 2002/0089251 A1 | * | 7/2002 | Tajima et al. ................ | 310/216 |
| 2002/0175583 A1 | * | 11/2002 | Kikuchi et al. ......... | 310/156.56 |

FOREIGN PATENT DOCUMENTS

| JP | A 3-103059 | 4/1991 | | |
|---|---|---|---|---|
| JP | 06245429 A | * | 9/1994 | ............ H02K/7/18 |

* cited by examiner

*Primary Examiner*—Karl Tamai
*Assistant Examiner*—Heba Yousri Elkassabgi
(74) *Attorney, Agent, or Firm*—Oliff & Berridge, PLC

(57) ABSTRACT

A generator-motor for a vehicle includes a rotor having a rotor core and a plurality of permanent magnets and a stator having a stator core and an armature winding. The rotor core has a plurality of axially extending through-holes in a circumferential direction thereof to accommodate the permanent magnets and to increase circumferential magnetic reluctance thereof to form a plurality of auxiliary pole portions disposed between the through holes. The stator core has a plurality of teeth radially extending at equal intervals in a circumferential direction to face the rotor core. Each of auxiliary pole has a circumferential width that is 30%–55% of a circumferential width of each tooth. The minimum torque of the generator motor can be increased while torque ripple is reduced.

8 Claims, 4 Drawing Sheets

GENERATOR-MOTOR FOR VEHICLE

CROSS REFERENCE TO RELATED APPLICATION

The present application is based on and claims priority from Japanese Patent Application 2001-122909, filed Apr. 20, 2001, the contents of which are incorporated herein by reference.

BACKGROUND OF THE INVENTION

1. Field of the Invention

The present invention relates to a generator-motor for a vehicle.

2. Description of the Related Art

Recently, a proposal to substitute a generator-motor for a starter motor has been presented, because such a generator-motor functions not only as a starter motor but also as a generator. In addition, it can recover kinetic energy while a vehicle is braking and also assist the engine with torque while the vehicle is accelerated.

An interior permanent magnet type synchronous machine is well known as a motor generator that is simple in structure and generates a large torque at a high efficiency. Such an interior permanent magnet type synchronous machine is comprised of a rotor having a rotor core and a plurality of permanent magnets and a stator having a multi-phase armature winding. The rotor core has a plurality of auxiliary pole portions disposed between the permanent magnets. Each auxiliary pole has a circumferential width that is about the same as a circumferential width of the tooth of the stator core in order to increase the average output torque. In other words, the ratio of the circumferential width of the auxiliary pole portion to the circumferential width of the tooth is larger than 0.85.

However, the output torque of such an interior permanent magnet type synchronous machine changes with the starting position of the rotor relative to the stator thereof when it is operated as a motor. Therefore, the size of the synchronous machine has to be large enough to start the engine even if the rotor stops at a position where the output torque is at a minimum. Thus, it is difficult to use a small-sized interior permanent magnet type synchronous machine for a starter.

SUMMARY OF THE INVENTION

Therefore, the present invention has been made in view of the above problems.

It is a main object of the invention to provide a compact generator-motor that can be used as an engine starter motor.

Another object of the invention is to provide an improved compact interior permanent magnet type synchronous machine whose minimum torque curve is comparatively high and flat.

According to a feature of the invention, a generator motor is comprised of a stator having teeth and slots and a rotor having a rotor core and permanent magnets. The rotor core has a plurality of axially extending through-holes to accommodate the permanent magnets and a plurality of auxiliary pole portions disposed between the through holes. Each auxiliary pole has a circumferential width that is 30%–55% of a circumferential width of the tooth. It is preferable that each auxiliary pole has a circumferential width that is 38%–50% of a circumferential width of each tooth.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A generator-motor for a vehicle according to a preferred embodiment of the invention is described with reference to the appended drawings.

Figure 1:
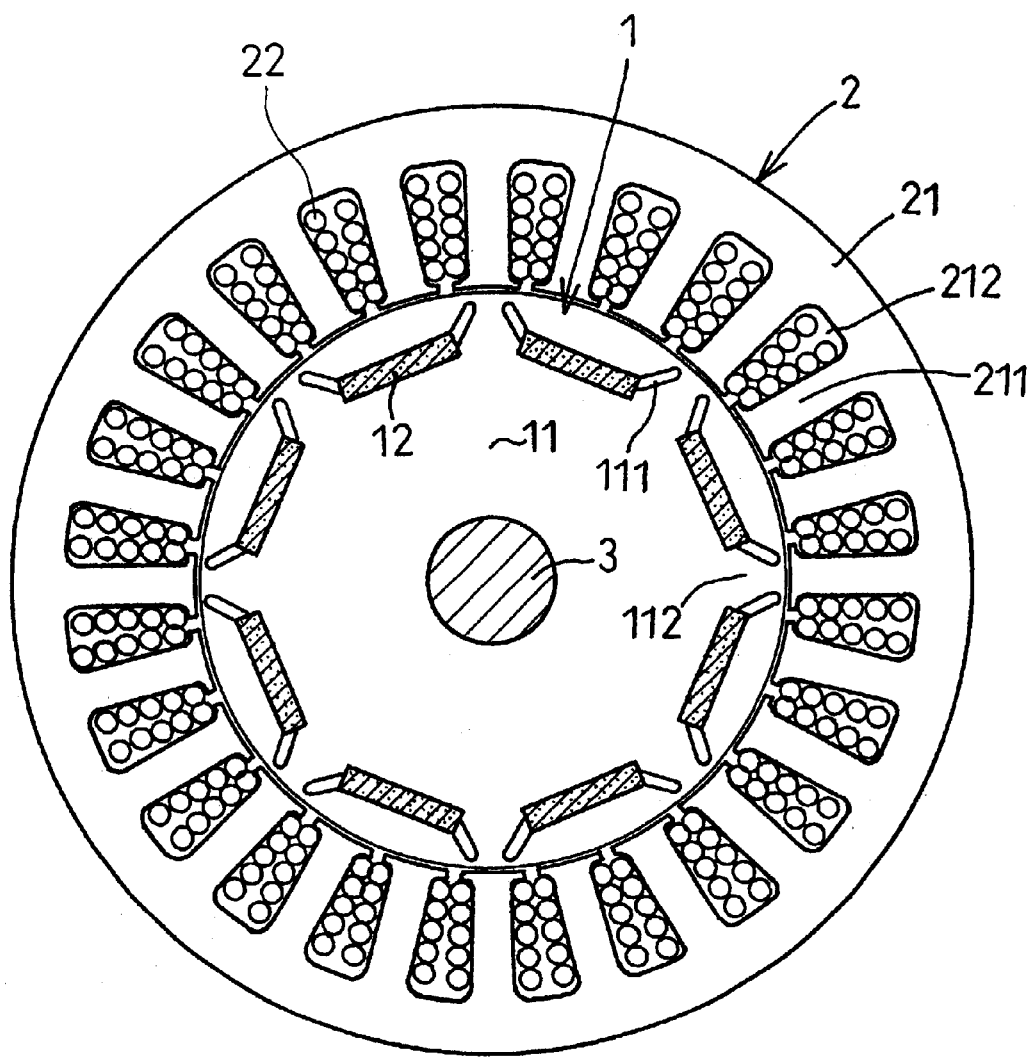
FIG. 1 is a schematic cross-sectional plan view of a generator-motor according to a preferred embodiment of the invention.

As shown in FIG. 1, the generator-motor is a synchronous rotary electric machine that has a plurality of permanent magnets. The generator motor has a rotor 1, a stator 2 and a shaft 3. The rotor 1 is connected to a crankshaft of an engine of a vehicle.

The rotor 1 is comprised of a core 11 made of laminated electro-magnetic steel sheets and a plurality of permanent magnets 12. The rotor core 11 has a plurality of axially extending through-holes 111 formed at 45-degree intervals in the circumferential direction of the rotor core 11 and a plurality of auxiliary pole portions 112 formed between two of the through-holes 111 or permanent magnets 12 that are adjacent to each other. Each of the permanent magnets 12 is in the shape of a rectangular plate and magnetized in the thickness direction thereof. The permanent magnets 12 are respectively inserted into the through-holes 111 so that the thickness direction thereof is parallel to the radial direction of the rotor. Each of the through-holes 111 has magnetic reluctance gaps that slantwise extend from the opposite circumferential ends thereof toward the periphery of the rotor core 11.

The stator 2 is comprised of a stator core 21 and a three-phase armature winding 22. The stator core 21 has twenty four pairs of teeth 211 and slots 212 at the inside surface thereof to accommodate phase windings of the three-phase armature winding 22.

Figure 2:
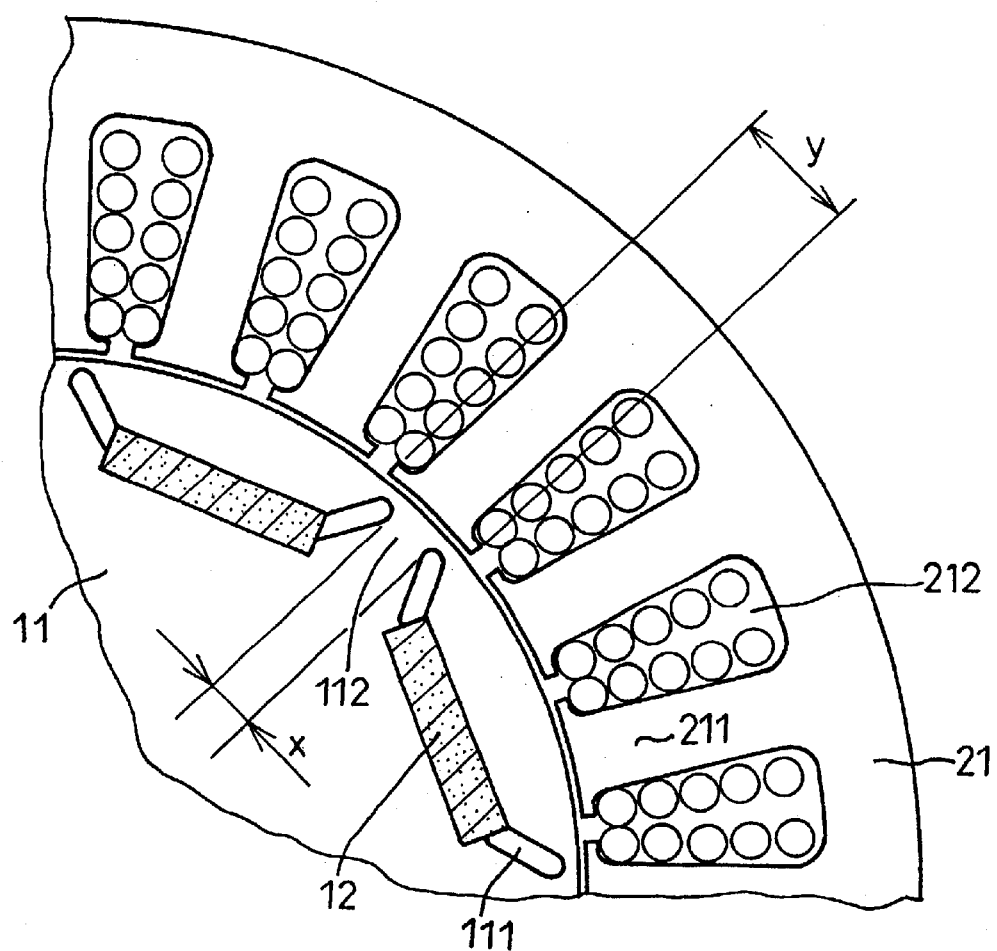
FIG. 2 is a fragmentary enlarged view of a portion shown in FIG. 1.

As shown in FIG. 2, the auxiliary pole 112 has a circumferential width x, and the tooth 211 has a circumferential width y. The ratio α of the circumferential width x of the auxiliary pole 112 to the circumferential width y of the tooth 211 is about 0.43.

Figure 3:
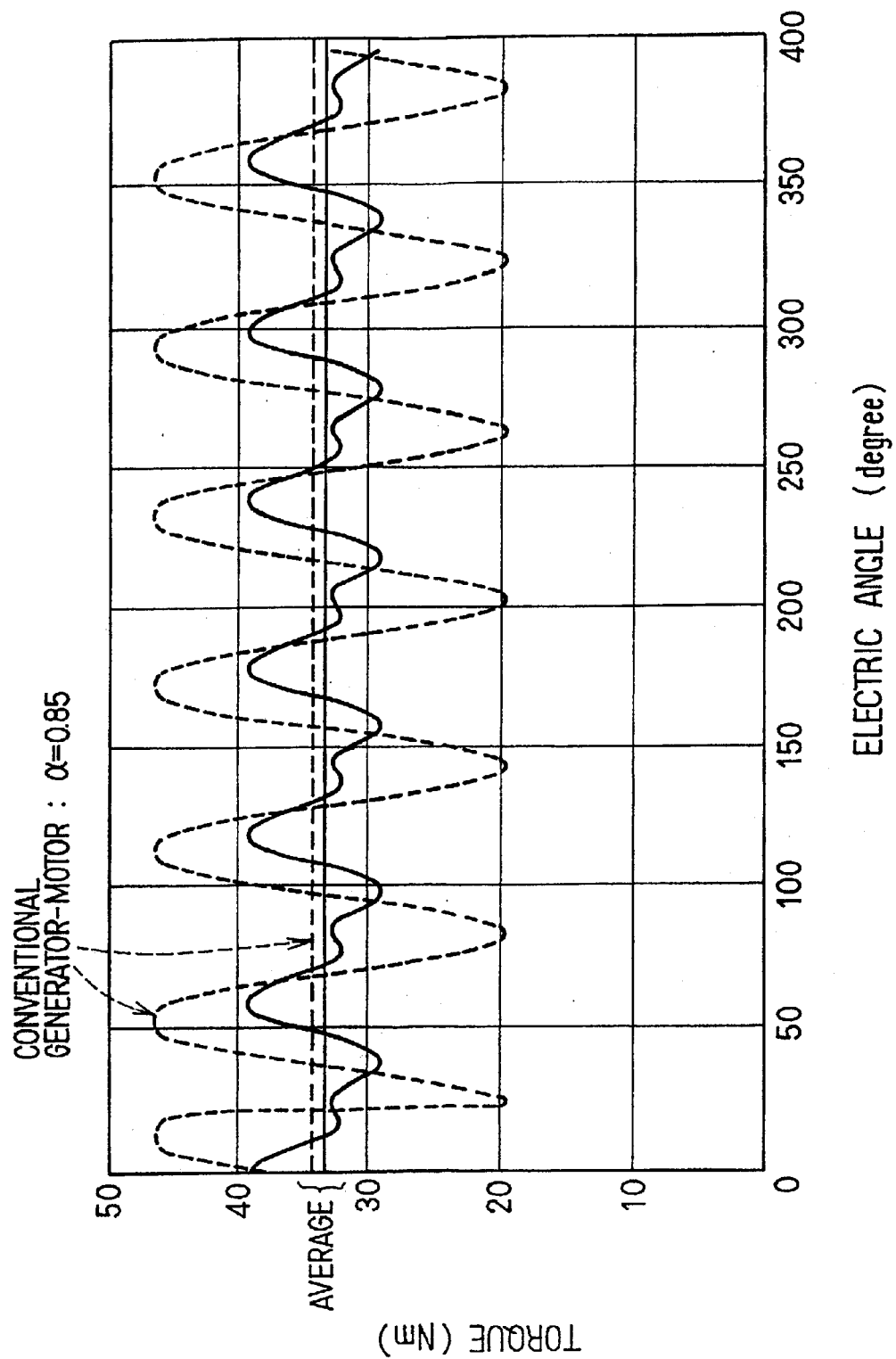
FIG. 3 is a graph showing torque curves of the generator-motor according to the preferred embodiment and a conventional machine with respect to the electric angles thereof.

According to a test result shown in FIG. 3, the output torque curve of the generator-motor according to the preferred embodiment of the invention has much less ripple than the output torque of a conventional interior permanent magnet type synchronous machine or synchronous rotary electric machine that has permanent magnets whose ratio α is about 0.85.

Figure 4:
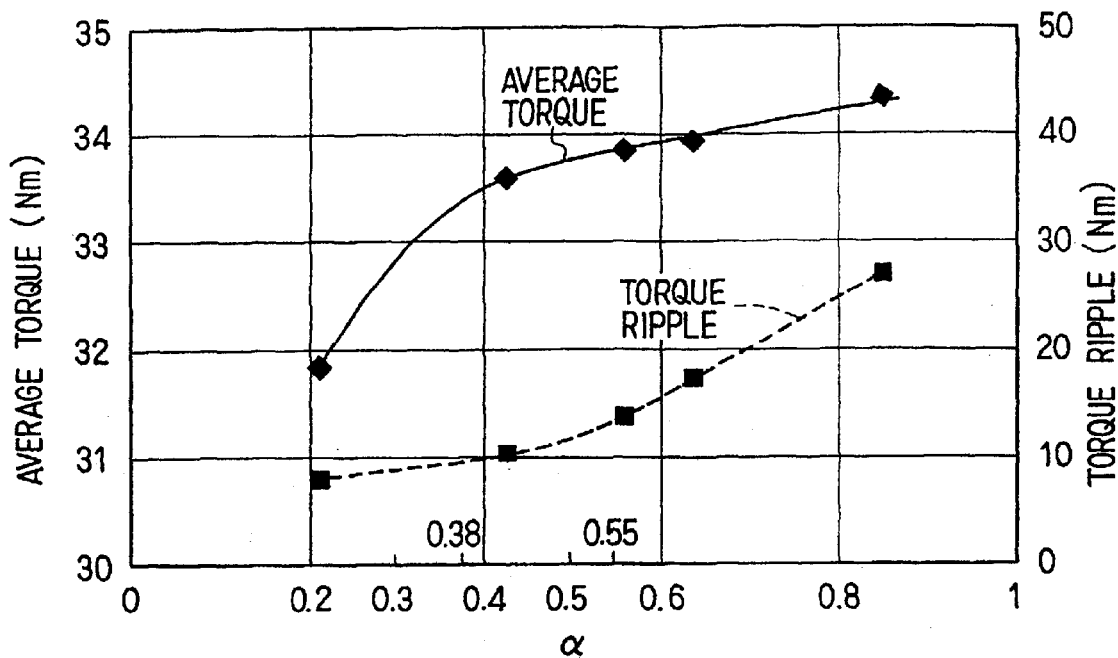
FIG. 4 is a graph showing a minimum torque curve with respect to ratios of circumferential tooth widths of a stator core to circumferential widths of auxiliary poles of a rotor.
Figure 5:
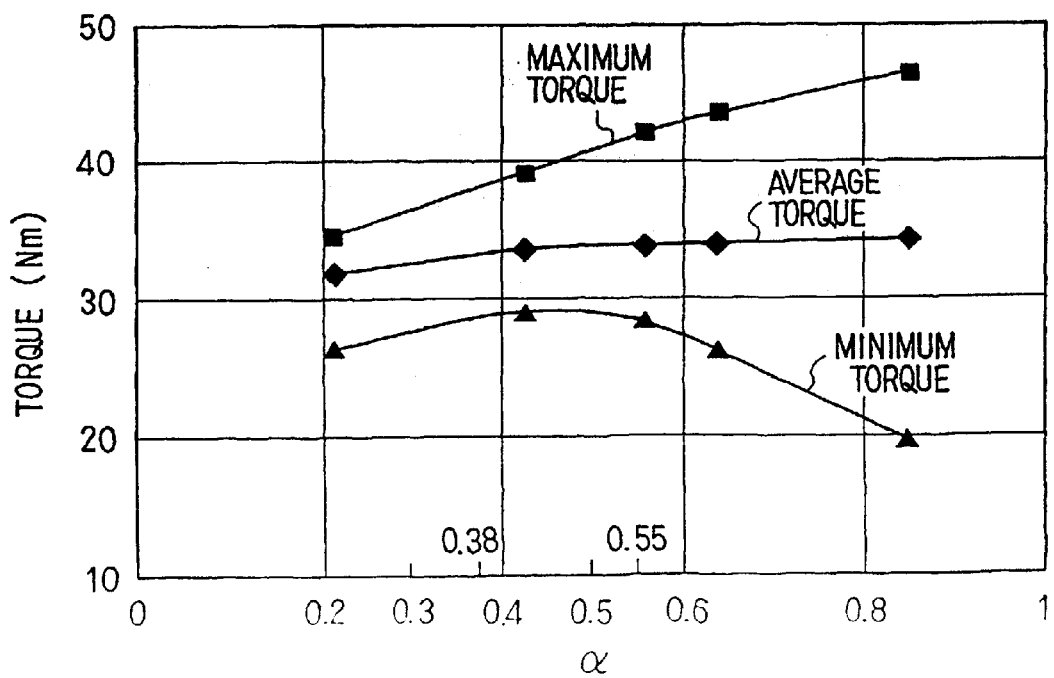
FIG. 5 is a graph showing a maximum torque curve with respect to ratios of circumferential tooth widths of a stator core to circumferential widths of auxiliary poles of a rotor.

As shown in FIG. 4, the average torque curve is almost flat, or the torque ripple sharply decreases as the ratio α decreases as far as the ratio α is between 0.8 and 0.38. On the other hand, the average torque sharply decreases, or the torque ripple gradually decreases as the ratio α decreases to be less than 0.38. As shown in FIG. 5, the minimum torque increases as the ratio α decreases as far as the ratio α is between 1 and 0.55, and the minimum torque curve is almost flat as the ratio a decreases to be less than 0.55. That is, the minimum torque, which is the most important for the engine starter motor, can be increased if the ratio α is set between 0.3 and 0.55, or more preferably between 0.38 and 0.5.

In the test, the three-phase electric voltage was applied to the armature winding of sampled generator-motors at a phase angle so that the generator-motors can generate its maximum torque. The effective motor current was 100 A.

Almost the same test result has been obtained from the test of the generator-motors having rotors of a different outside diameter.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A generator-motor for generating electric power and starting an engine of a vehicle including a rotor to be connected to the engine and having a rotor core and a plurality of permanent magnets and a stator having a stator core and an armature winding disposed in said stator core; wherein said rotor core has a plurality of axially extending through-holes disposed at equal intervals in a circumferential direction thereof to accommodate said permanent magnets and to increase circumferential magnetic reluctance thereof thereby forming a plurality of auxiliary pole portions between said through holes;

said stator core has a plurality of teeth radially extending at equal intervals in a circumferential direction to face said rotor core; and each of said auxiliary poles has a circumferential width that is 30%–55% of a circumferential width of each of said teeth.

2. The generator-motor as claimed in claim 1, wherein each of said auxiliary poles has a circumferential width that is 38%–50% of a circumferential width of each of said teeth.

3. A generator-motor for generating electric power and starting an engine of a vehicle, comprising:

a rotor to be connected to the engine and having a rotor core and a plurality of permanent magnets, said rotor core having a plurality of axially extending through-holes disposed at equal intervals in a circumferential direction thereof to accommodate said permanent magnets and to increase circumferential magnetic reluctance thereof and a plurality of auxiliary pole portions disposed between said through holes; and a stator having a stator core and armature winding wound around said stator core, said stator core having a plurality of teeth radially extending at equal intervals in a circumferential direction to face said rotor core, wherein each of said auxiliary poles has a circumferential width that is 30%–55% of a circumferential width of each of said teeth.

4. The generator-motor claimed in claim 3, wherein each of said auxiliary poles has a circumferential width that is 38%–50% of a circumferential width of each of said teeth.

5. A generator-motor for generating electric power and starting an engine of a vehicle, comprising:

a rotor to be connected to the engine and having a magnetic rotor core and a plurality of permanent magnets for forming a magnetic field, said rotor core having a plurality of axially extending through-holes disposed at equal intervals in a circumferential direction thereof to accommodate said permanent magnets and to reduce magnetic flux leakage between said permanent magnets and plurality of auxiliary pole portions disposed between said permanent magnets; and a stator having a magnetic stator core and a multi-phase armature winding, said stator core having a plurality of pairs of a tooth and a slot radially extending at equal intervals in a circumferential direction to accommodate said armature winding, wherein each of said auxiliary poles has a circumferential width that is 30%–55% of a circumferential width of said tooth.

6. The generator-motor as claimed in claim 5, wherein each of said auxiliary poles has a circumferential width that is 38%–50% of a circumferential width of each of said teeth.

7. An interior permanent magnet synchronous machine type generator-motor for generating electric power and starting an engine of a vehicle, comprising:

a stator having a magnetic stator core and a multi-phase armature winding, said stator core having a plurality of pairs of a tooth and a slot radially extending at equal intervals in a circumferential direction to accommodate said armature winding; and a rotor to be connected to the engine, said rotor having a magnetic rotor core and a plurality of permanent magnets for supplying magnetic flux to said armature winding, said rotor core having a plurality of axially extending through-holes disposed at equal intervals in a circumferential direction thereof to accommodate said permanent magnets and to form auxiliary poles between said permanent magnets, wherein each of said auxiliary poles has a circumferential width that is 30%–55% of a circumferential width of said tooth.

8. The generator-motor as claimed in claim 7, wherein each of said auxiliary poles has a circumferential width that is 38%–50% of a circumferential width of each of said teeth.

* * * * *